(12) United States Patent
Short et al.

(10) Patent No.: US 7,387,430 B2
(45) Date of Patent: Jun. 17, 2008

(54) MIXING MACHINE HAVING POWER TAKE OFF AND MIXER HEAD COVER

(75) Inventors: Ellis Gale Short, Troy, OH (US); Brian E. Bader, Springfield, OH (US); Joseph C. Huang, Dayton, OH (US)

(73) Assignee: Premark FEG L.L.C., Wilmington, DE (US)

( * ) Notice: Subject to any disclaimer, the term of this patent is extended or adjusted under 35 U.S.C. 154(b) by 411 days.

(21) Appl. No.: 11/071,925

(22) Filed: Mar. 4, 2005

(65) Prior Publication Data

US 2006/0198240 A1 Sep. 7, 2006

(51) Int. Cl.
*B01F 7/30* (2006.01)
(52) U.S. Cl. .................. 366/197; 366/206; 366/288
(58) Field of Classification Search ................ 366/197, 366/206, 207, 288, 601
See application file for complete search history.

(56) References Cited

U.S. PATENT DOCUMENTS

| | | | |
|---|---|---|---|
| 2,565,626 A | * | 8/1951 | Prince et al. .................. 476/70 |
| 2,616,674 A | * | 11/1952 | Polivka et al. ............... 366/206 |
| 2,662,421 A | * | 12/1953 | Van Guilder ............. 74/606 R |
| 2,789,798 A | | 4/1957 | Brace |
| 3,224,743 A | | 12/1965 | Freedman et al. |
| 3,934,758 A | | 1/1976 | Kipp |
| 4,325,643 A | | 4/1982 | Scott et al. |
| 4,697,929 A | | 10/1987 | Muller |
| 4,819,460 A | | 4/1989 | Obradovic |
| 4,822,172 A | | 4/1989 | Stottman |
| 5,000,578 A | | 3/1991 | Artin et al. |
| 5,040,899 A | | 8/1991 | Koskinen |
| 5,306,083 A | | 4/1994 | Caldwell et al. |
| 5,348,393 A | | 9/1994 | Pappas, Jr. |
| 5,472,276 A | | 12/1995 | Ratermann et al. |
| 5,653,535 A | | 8/1997 | Xie et al. |
| 5,690,427 A | | 11/1997 | Jennings |
| 5,736,828 A | | 4/1998 | Turner et al. |
| 5,844,343 A | | 12/1998 | Horst |
| 5,872,435 A | | 2/1999 | Bolte et al. |
| 5,906,432 A | | 5/1999 | Wade et al. |
| 5,934,802 A | | 8/1999 | Xie |
| 5,957,021 A | | 9/1999 | Meredith et al. |
| 6,066,074 A | | 5/2000 | Marcinkiewicz |
| 6,612,732 B2 | | 9/2003 | Blakeman et al. |
| 2002/0093877 A1 | | 7/2002 | Brunswick et al. |
| 2002/0186615 A1 | | 12/2002 | Wilson |
| 2004/0208082 A1 | | 10/2004 | Huang et al. |

FOREIGN PATENT DOCUMENTS

GB 861915 3/1961

* cited by examiner

*Primary Examiner*—David L Sorkin
(74) *Attorney, Agent, or Firm*—Thompson Hine LLP

(57) ABSTRACT

A mixing machine includes a removable head cover that may be formed of plastic and that may include a nose portion that is disposed about a power take off the mixing machine.

14 Claims, 6 Drawing Sheets

MIXING MACHINE HAVING POWER TAKE OFF AND MIXER HEAD COVER

TECHNICAL FIELD

The present application relates to mixing machines such as the type commonly used for mixing food products, and more particularly to a mixer head cover for a mixing machine.

BACKGROUND

Many commercial mixers include an electric motor and various other electrical components and mechanical components, such as gears, internal of the mixing machine. Mixing machines have used removable mixer head covers in the past to provide access to various of the components to facilitate service/maintenance, where the mixer head cover was generally of a short height such as that shown in U.S. Pat. No. Des. 468,581.

It would be advantageous to incorporate improvements into mixer head covers used on mixing machines.

SUMMARY

In one aspect, a mixing machine includes a mixer body including a head portion, a base portion and a support portion connecting the head portion and the base portion with the head portion spaced apart from the base portion, the head portion at least partially overhanging a bowl receiving location. An output member extends from the head portion in a direction toward the bowl receiving location. A motor is mechanically linked to the output member for effecting rotation of the output member about a first axis and orbiting movement of the output member and first axis about a second axis. A power take off extends outwardly from a front side of the head portion. The head portion includes a removable head cover positioned such that a headspace is formed within the removable head cover. The removable head cover includes a front opening through which the power take off extends such that cooperation between the power take off and the front opening aids in holding the removable head cover in an operating position on the head portion.

In another aspect, a method of assembling a mixing machine involves the steps of: providing a mixer body including a head portion formed in part by a metal base that includes a power take off protruding from a front side thereof, the head portion at least partly overhanging a bowl receiving location, the head portion including a movable output component that extends toward the bowl receiving location; mounting at least part of a mixer drive system atop the metal base for effecting rotation of the movable output component; providing a mixer head cover with an opening located in a front portion thereof; and attaching the mixer head cover to the head portion so as to cover the part of the mixer drive system, including aligning the opening of the mixer head cover with the power take off of the mixer head portion and positioning the mixer head cover such that the power take off protrudes through the opening of the mixer head cover.

In still another aspect, a method of assembling a mixing machine involves: providing a mixer body including a head portion at least partly overhanging a bowl receiving location, the head portion including a movable output component that extends toward the bowl receiving location; mounting part of an output component drive system within the mixer body, the part of the output component drive system includes a control wiring interface for receiving control signals from a user interface; assembling a combined mixer head cover and user interface, the mixer head cover including top, left and right side portions, the user interface including one or more electrical components for providing control signals to the part of the output component drive system via a control wiring interface; attaching the combined mixer head cover and user interface to the head portion, including: positioning the combined mixer head cover and user interface in proximity to the head portion; connecting the control wiring interface of the combined mixer head cover and user interface to the control wiring interface of the mixer body; securing the combined mixer head cover and user interface to the head portion after the connecting step in a manner to contain the connection between the control wiring interfaces within the mixer body.

In a further aspect, a mixing machine includes a mixer body including a head portion, a base portion and a support portion connecting the head portion and the base portion with the head portion spaced apart from the base portion, the head portion at least partially overhanging a bowl receiving location. An output member extends from the head portion in a direction toward the bowl receiving location. A motor is mechanically linked to the output member for effecting rotation of the output member about a first axis and orbiting movement of the output member and first axis about a second axis. The head portion includes a removable head cover positioned such that a head space is formed within the removable head cover, the removable head cover formed by a molded plastic cover body having top, left and right side portions providing a downwardly open cavity. The molded plastic cover body includes a protruding control panel base that is molded unitary with one of the side portions.

The details of one or more embodiments are set forth in the accompanying drawings and the description below.

DETAILED DESCRIPTION

Figure 1:
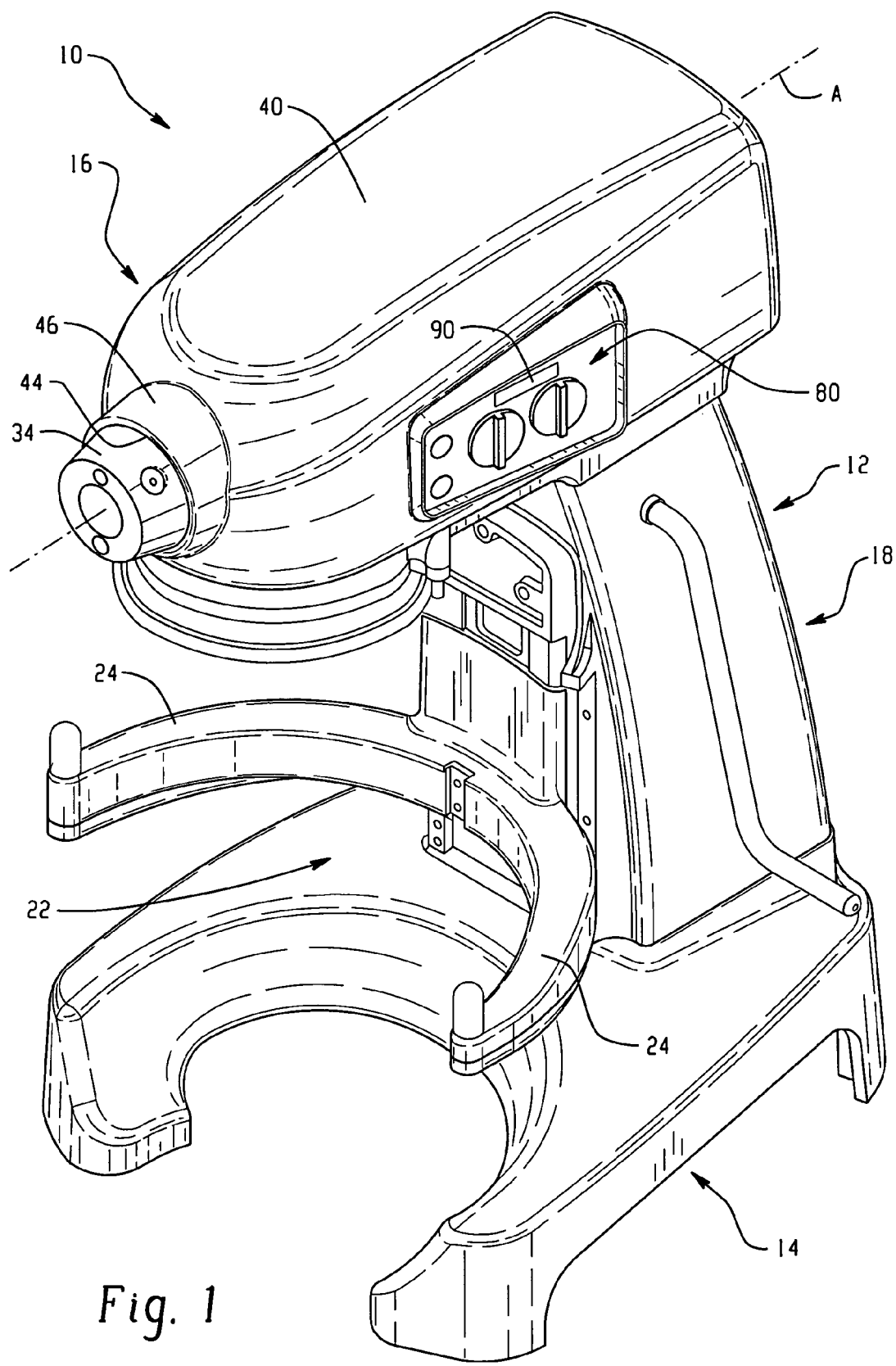
FIG. 1 is a perspective view of an embodiment of a mixing machine.
Figure 2:
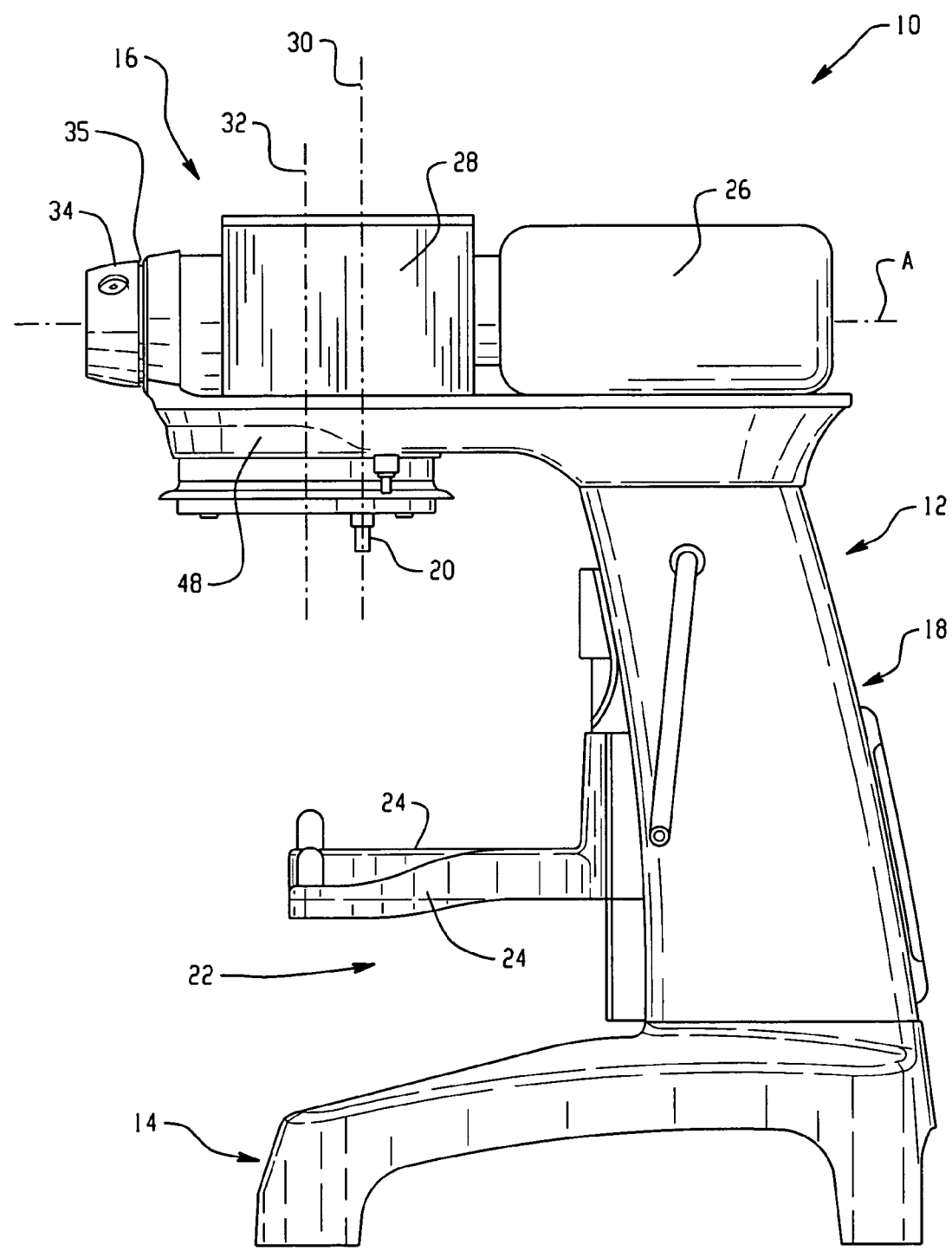
FIG. 2 is a side view of the mixing machine of FIG. 1 with the cover removed.

Referring to FIGS. 1 and 2, a mixing machine 10 includes a mixer body 12 having a base portion 14, a head portion 16 and a support portion 18 (e.g., in the form of a column) connecting the head portion and the base portion in a vertically spaced apart relationship. A front to back head portion axis A is shown. An output member 20 (e.g., a shaft for receiving a mixer tool such as a beater or whip) extends downward from the head portion 16 in a direction toward a bowl receiving location 22 formed between the arms 24 of a bowl receiving yoke that can be moved upward and downward relative to the head portion 16 by rotation of the illustrated handle. A motor 26 may be mechanically linked to the output member 20, as by a gear system 28, for effecting rotation of the output member about a first axis 30 and orbiting movement of the output member 20 and first axis 30 about a second axis 32. A power take off 34 extends outwardly from a front side of the head portion 16 and may take the form of a protruding hub or boss that is adapted for connection with mixer accessories such as meat grinders, slicers etc. Internal of the power take off 34 is a drive member that is rotated by the motor 26 via the gear system 28.

Figure 3:
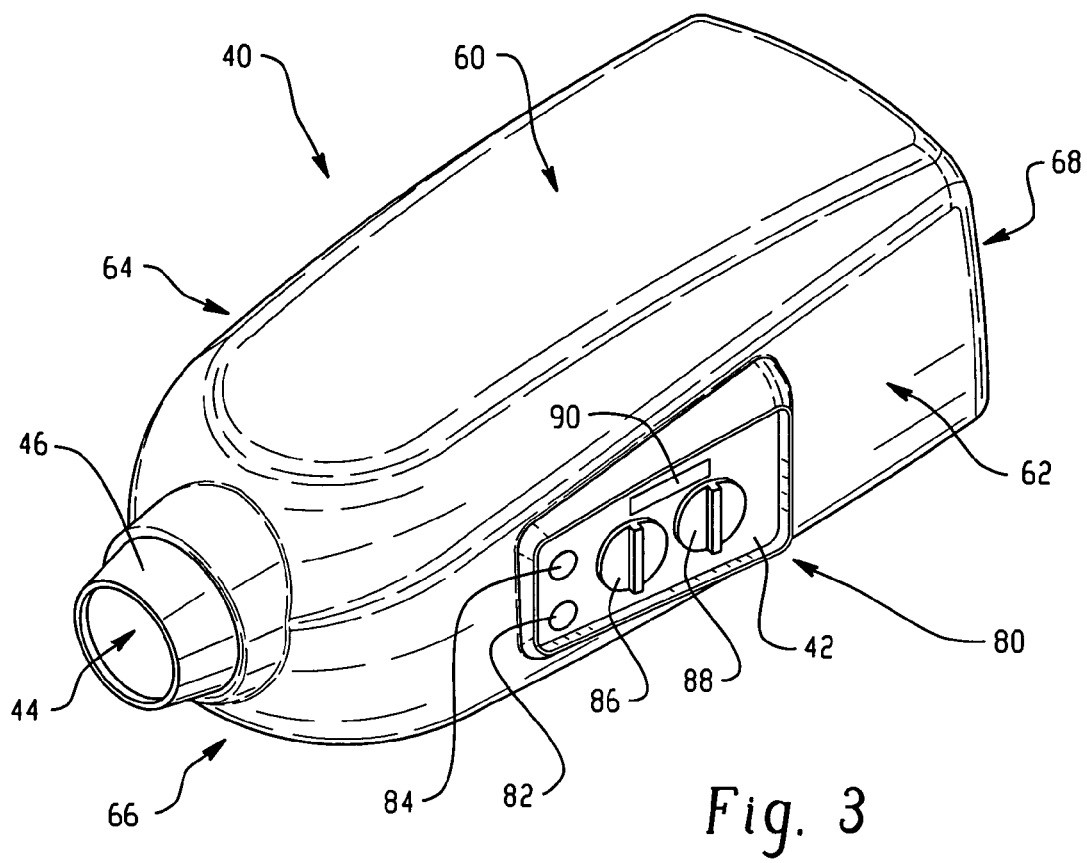
FIG. 3 is a perspective view of an embodiment of a cover.
Figure 4:
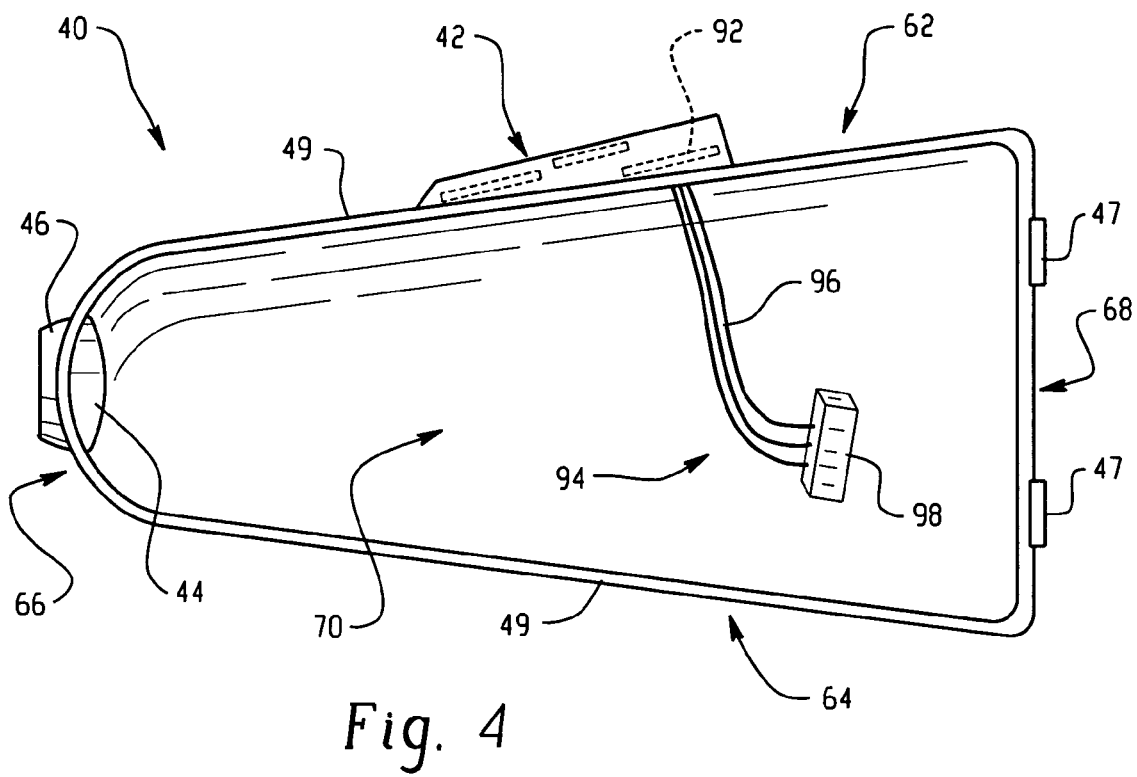
FIG. 4 is a bottom view of the cover of FIG. 3.

At least partially covering the head portion 16 is a removable head cover 40 that when secured to the mixer body 12 forms a relative enclosure therebetween. As best seen in FIGS. 3 and 4, the cover 40 includes top 60, left 62, right 64, front 66 and rear 68 side portions and an open bottom to form a head space 70 or downwardly open cavity therein. In one embodiment, the removable head cover is formed of a molded polymeric material (e.g., plastic) so that the top, left, right, front and rear side portions are of unitary construction. The removable head cover 40 includes a protruding control panel base 42 that may be unitary with one of the side portions, simplifying manufacture as compared to an arrangement in which a control panel base is a separate piece that must be fastened or otherwise connected to the side the mixer head cover.

The removable head cover 40 includes a front opening 44 through which the power take off 34 extends (FIG. 1) such that cooperation between the power take off 34 and the front opening 44 aids in holding the removable head cover 40 in an operating position (e.g., the down position of FIG. 1) on the head portion 16. In the illustrated embodiment, the power take off 34 has a generally frusto-conical shape and the front opening 44 is located in a protruding nose portion 46 located on the front side of the removable head cover 40. The power take off 34 may include an annular gasket seat 35 (FIG. 2) in which a sealing gasket is placed. The nose portion 46 may surround a rear portion of the power take off 34 as seen in FIG. 1, where an inward edge of the front opening 44 seats/seals against the outer surface of a gasket in the gasket seat. As best seen in FIG. 2, the power take off 34 may be incorporated into a metal casting that includes lower head part 48 (which extends from front to back of the mixer head) and the gear box for gear system 28, with a removable metal plate sitting atop the gear box to enclose the gear system.

Figure 6:
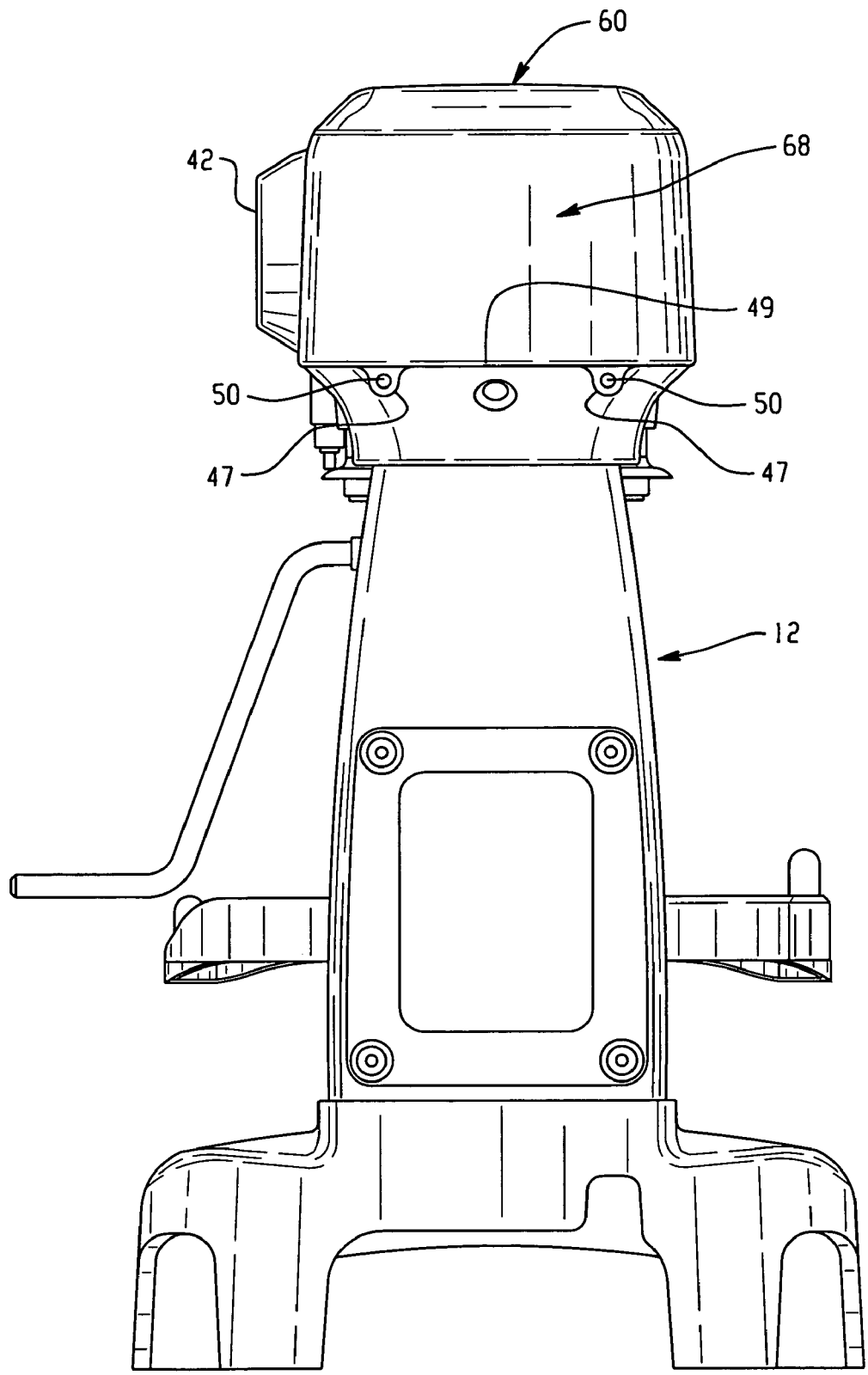

As shown in FIG. 6, the illustrated head cover includes mount portions 47 that extend downward from a lower peripheral edge 49 of the head cover and include respective openings for receiving fasteners 50 that secure the head cover to the mixer body. The lower peripheral edge 49 of the head cover 40 may be disposed against an outside surface of the top peripheral edge of the metal casting, where a gasket may be placed on such top peripheral edge. As best reflected in a comparison of FIGS. 1 and 2 a height of the removable head cover 40 may be at least 75% of an overall height of the head portion 16 of the mixer body, but height variations are possible. As reflected from FIG. 2 the motor 26 and gear system 28 will be disposed within the headspace of the mixer head cover when the mixer head cover is placed in its operating position.

Figure 5:
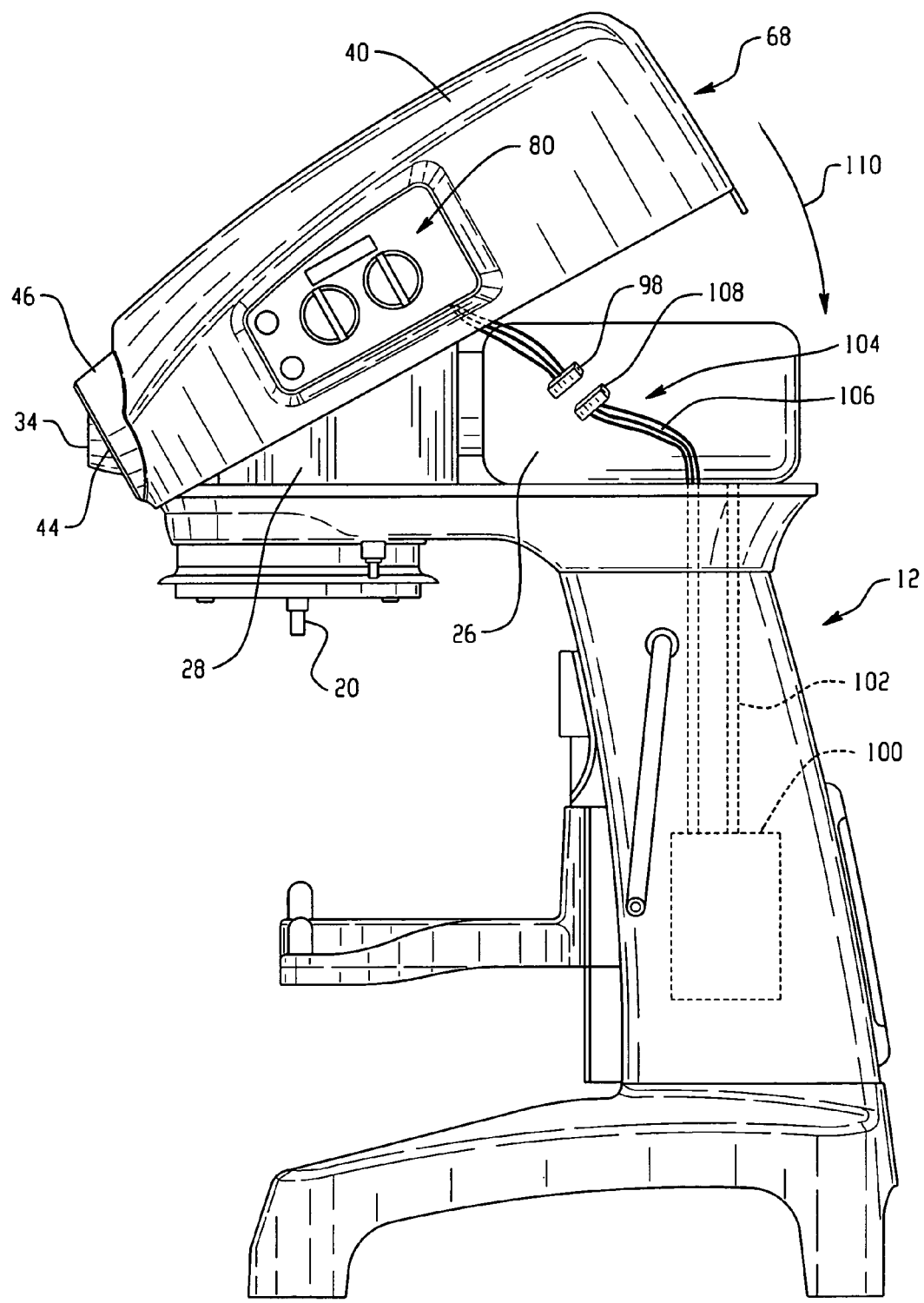
FIGS. 5 and 6 illustrate a process for assembling the mixing machine of FIG. 1.

Referring now primarily to FIGS. 3 and 4, in connection with mixing machine manufacture and assembly, prior to placing the mixer head cover 40 onto the mixing machine, the mixer head cover can be preassembled to include a user interface 80 on the control panel base 42. The illustrated user interface 80 includes a mix start button 82, a mix stop button 84, a rotatable speed input mechanism 86 and a rotatable time input mechanism 88 and a display 90. Electronics 92 of the user interface (e.g., such as the display, display driver, switches connected to buttons 82, 84 and mechanisms 86 and 88, including one or more printed circuit boards) are shown in dashed line form in FIG. 4 and may be located one the backside of the control panel base 40. The electronics are preassembled with the mixer head cover to form a combined mixer head cover and user interface that is ready for installation onto the mixing machine. In this regard, the electronics 92 of the user interface may be provided with a control wiring interface 94, which in one embodiment takes the form of a suitable wiring harness 96 and associated electrical connector or connectors 98. Once the mixer head cover and user interface are assembled, the combination can be installed onto the mixing machine as will be described below with reference to FIGS. 5 and 6.

The mixer body includes portions of the drive system for the output component, including by way of example the motor 26 and a motor drive 100 (shown in dashed line form within the column 12 of the mixer body). In one embodiment the motor 26 is an AC induction motor and the drive 100 is a variable frequency inverter drive, but variations are possible. The drive 100 is connected to the motor via representative wires 102, but also needs to be connected to the user interface 80 to receive control signals. Accordingly, the drive 100 is provided with a control wiring interface 104, which in one embodiment takes the form of a wiring harness 106 and associated electrical connector or connectors 108. The electrical connector 108 is configured for readily mating with the electrical connector 98 of the user interface. Thus, during mixing machine assembly the combined mixer head cover and user interface may be positioned on the mixing machine as follows. The front opening 44 of the head cover is positioned into alignment with and in front of the power take off 34 while the rear portion of the head cover is tilted slightly upward, and the head cover is moved rearward so that the power take off 34 at least partially protrudes through the opening 44. The electrical connector 98 is then connected with the electrical connector 108 to complete the connection of the user interface 80 to the rest of the drive system. The rear side of the mixer head cover 40 can then be moved downward as reflected by arrow 110 so as to enclose and contain the motor 26, gear system 28 and the interconnected electrical connectors 98 and 108. The downward extending mount portions 47 of the head cover are aligned with openings in the metal casting of the lower head portion and fasteners 50 are inserted therein. In this manner cooperation between the head cover nose portion 46 and the power take off 34 holds the head cover in the operating position at the front side and the fasteners 50 hold the head cover in the operating position at the rear side. In one embodiment the mount portions 47 may be unitary with the head cover. In another embodiment, the inside of the head cover may be formed with unitary mount bases to which a metal mount flange is connected, the metal mount flange extending downward below the lower edge of the head portion, in which case the mount portions 47 may insert within the casting that defines the lower portion of the head.

Notably, by preassembling the mixer head cover 40 with the electrical components 92 of the user interface 80, including the control wiring interface 94, final assembly is streamlined as compared to any attempt to install the user interface components after the mixer head cover has been installed on the mixing machine. In particular, the mixer head cover and user interface combination can be preassembled at a different location, if desired, and then shipped to the site of the mixing machine for final assembly.

Figure 7:
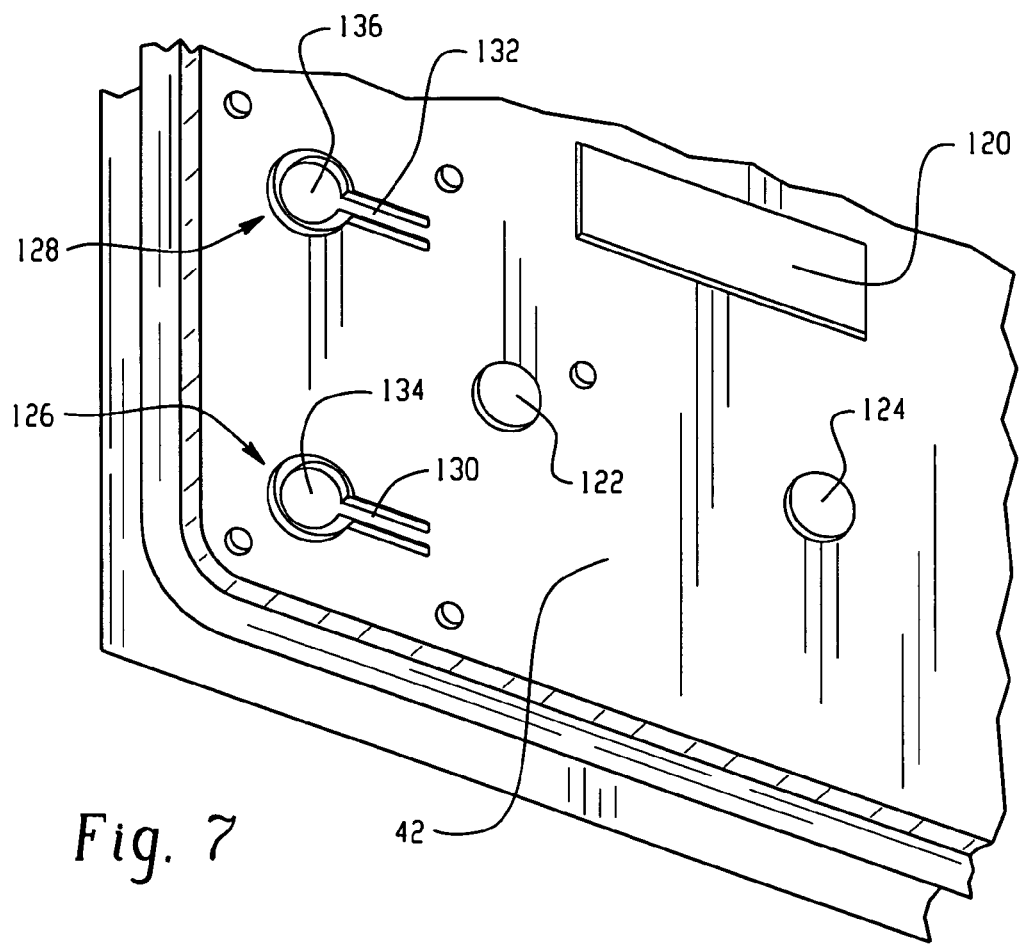
FIG. 7 is an enlarged partial view of the control panel base of the mixer head cover.

Referring now to FIG. 7, a portion of the control panel base 42 is shown without buttons or other components installed. As seen, the base 42 includes a display window 120, openings 122 and 124 through which rotatable shafts of switch mechanisms can extend for the timer and the speed control, and start and stop button features 126 and 128 respectively. In this regard, upon final assembly suitable electrical switch assemblies are positioned behind the start and stop button features 126 and 128, which take the form of resilient fingers having respective elongate portions 130 and 132 and respective head portions 134 and 136. In each case the elongate portions 130 and 132 are connected with the rest of the base 42 and provide a bias that tends to hold the fingers into normal positions. Likewise, when the head portions 134 and 136 are moved inward (as would occur by depression of the start or stop button), the resiliency of the elongate portions 130 and 132 tends absorb some of the depression energy (which in some cases may preserve the life of the switch component) and also tends to move the start or stop button back to its non-triggering position when such button is released.

Figures 8, 9:
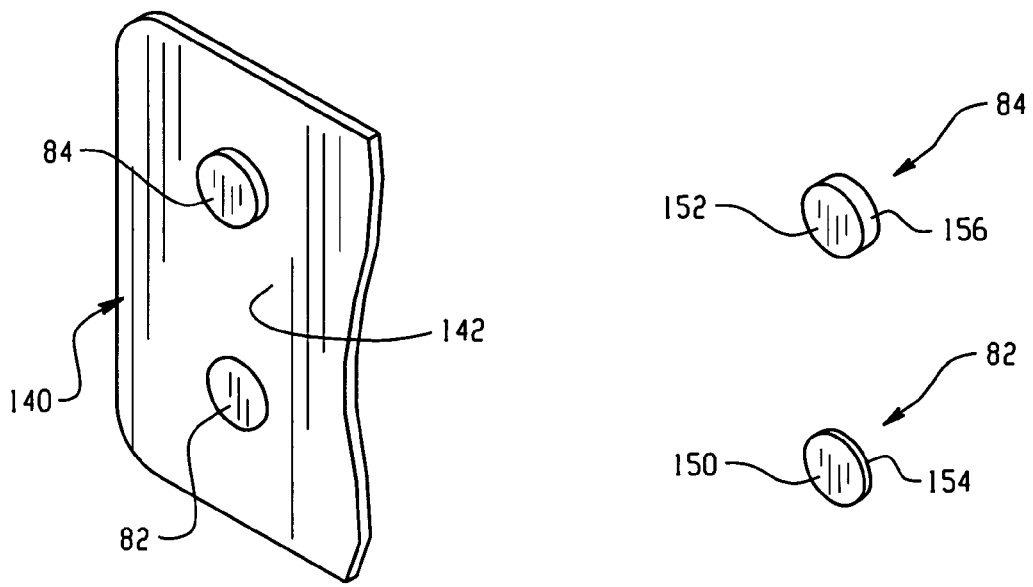
FIG. 8 is a partial perspective of a user interface overlay with start and stop buttons.
FIG. 9 is a perspective rear view of one embodiment of the start and stop buttons.

In this regard, exemplary start and stop button configurations are shown in perspective in FIG. 8, where the buttons 82 and 84 are interconnected with a thin overlay 140 (shown only in part) that can be adhesively applied to the surface of the base 42. As shown, start button 82 has a generally flat profile relative to the surface 142 of the overlay, which aids in avoiding undesired engagement of start operations. In contrast, stop button 84 has a generally raised profile relative to the surface 142, which facilitates ease of engagement of the stop function. In one embodiment the stop button 84 may simply be a thicker piece of plastic. However, as seen from the rear view of the buttons provided in FIG. 9, in another arrangement both the start button 82 and the stop button 84 are formed by respective, generally planar portions 150 and 152 that have respective peripheral lips or flanges 154 and 156 extending rearwardly therefrom, with peripheral lip 156 having a greater depth than peripheral lip 154. In such an embodiment, and referring again to FIG. 7, at least the head portion 136 of stop button feature 128 may include a raised surface that will fit within the lip 156 so as to contact the rear side of the planar portion 152 of the stop button 84. In contrast, the head portion 134 of start button feature 126 may be generally flat or only slightly raised.

In some cases the above-described details of the control panel base 42 may be formed during a molding process and/or the features may be formed by cutting away portions of the plastic material after the molding operation is complete. In either case, the start and stop button features would be considered as formed unitary with the rest of the control panel base as a monolithic structure.

It is to be clearly understood that the above description is intended by way of illustration and example only and is not intended to be taken by way of limitation, and that changes and modifications are possible. Accordingly, other embodiments are contemplated.

What is claimed is:

1. A mixing machine, comprising:
   a mixer body including a head portion, a base portion and a support portion connecting the head portion and the base portion with the head portion spaced apart from the base portion, the head portion at least partially overhanging a bowl receiving location;
   an output member extending from the head portion in a direction toward the bowl receiving location;
   a motor mechanically linked to the output member for effecting rotation of the output member about a first axis and orbiting movement of the output member and first axis about a second axis;
   a power take off extending outwardly from a front side of the head portion, the power take off comprising a hub including an internal drive member that drives a mixer accessory; and
   the head portion includes a removable head cover positioned such that a head space is formed within the removable head cover, the removable head cover including a front opening through which the power take off extends such that the power take off extends forward beyond the head cover and cooperation between at least a rear portion of the power take off and the front opening aids in holding the removable head cover in an operating position on the head portion.

2. The mixing machine of claim 1, wherein top, left, right, front and rear side portions of the removable head cover are of unitary construction of a polymeric material.

3. The mixing machine of claim 2, wherein the removable head cover includes a protruding control panel base that is unitary with one of the side portions.

4. The mixing machine of claim 1 wherein the removable head cover further includes at least one mount portion with an opening for receiving a fastener.

5. The mixing machine of claim 1 wherein the front opening is located in a protruding nose portion located on a front side portion of the removable head cover.

6. The mixing machine of claim 5 wherein the nose portion surrounds the rear portion of the power take off.

7. The mixing machine of claim 1 wherein the power take off is incorporated into a metal casting that forms part of the head portion and the removable head cover is formed primarily of a plastic material.

8. The mixing machine of claim 7 wherein the removable head cover includes a mount portion with an opening that aligns with an opening in the metal casting, a removable fastener disposed through the aligned openings to further aid in holding the removable head cover in the operating position.

9. The mixing machine of claim 7, wherein the removable head cover is molded from the plastic material.

10. The mixing machine of claim 9, wherein the removable head cover includes a protruding control panel base that is molded from the plastic material and is unitary with a side portion of the removable head cover.

11. The mixing machine of claim 7 wherein a lower peripheral edge of the removable head cover is disposed against an outside surface of a top peripheral edge of the metal casting.

12. The mixing machine of claim 1 wherein a height of the removable head cover is at least 75% of an overall height of the head portion of the mixer body.

13. The mixing machine of claim 1 wherein at least part of the motor is disposed within the headspace.

14. The mixing machine of claim 1, wherein the front opening and hub are respectively configured to permit the front opening to slide onto and off of the hub during head cover installation and removal.

* * * * *